United States Patent [19]
Rolin

[11] Patent Number: 5,573,058
[45] Date of Patent: Nov. 12, 1996

[54] AIR-CONDITIONING INSTALLATION FOR ROOM SPACES

[75] Inventor: Ingmar Rolin, Espoo, Finland

[73] Assignee: ABB Flakt Aktiebolag, Stockholm, Sweden

[21] Appl. No.: 244,170

[22] PCT Filed: Nov. 11, 1992

[86] PCT No.: PCT/FI92/00306

§ 371 Date: May 20, 1994

§ 102(e) Date: May 20, 1994

[87] PCT Pub. No.: WO93/10403

PCT Pub. Date: May 27, 1993

[30] Foreign Application Priority Data

Nov. 22, 1991 [FI] Finland ..................... 915511

[51] Int. Cl.⁶ .............. F25B 29/00; F24F 12/00; F24F 5/00; F24F 3/00
[52] U.S. Cl. .............. 165/210; 165/54; 165/59; 165/66; 165/909; 165/104.31
[58] Field of Search .............. 165/104.31, 59, 165/66, 909, 54, 16

[56] References Cited

U.S. PATENT DOCUMENTS

| | | | |
|---|---|---|---|
| 3,968,833 | 7/1976 | Strindehog et al. | 165/104.31 |
| 4,061,186 | 12/1977 | Ljung | 165/104.31 |
| 4,084,635 | 4/1978 | Marshall | 165/909 |
| 4,142,575 | 3/1979 | Glancy | 165/16 |
| 4,182,403 | 1/1980 | Margen | 165/104.31 |

FOREIGN PATENT DOCUMENTS

| | | | |
|---|---|---|---|
| A2 363340 | 11/1991 | European Pat. Off. | |
| B 60439 | 9/1981 | Finland | |
| 2316030 | 10/1974 | Germany | 165/909 |
| 2411558 | 9/1975 | Germany | 165/66 |
| A1 2601127 | 7/1977 | Germany | |
| WOA184/03756 | 9/1984 | WIPO | |
| WO90/10828 | 9/1990 | WIPO | |
| WO91/02927 | 3/1991 | WIPO | |

*Primary Examiner*—John K. Ford
*Attorney, Agent, or Firm*—Fitch, Even, Tabin & Flannery

[57] ABSTRACT

Air-conditioning installation for room spaces (1), comprising a heat transfer device (4) for preheating supply air (A) by transferring heat from exhaust air (B) into the supply air; heating means including a heating source (11) for further heating the supply air; cooling means including a cooling source (14) for cooling the supply air; and adjusting means (16, 17, 18, 21, 32, 33, 34) for sensing the temperature of the supply air and for controlling the heat transfer device and the heating and cooling means on the basis of the sensed temperature. To simplify the structure of the installation, the heating and cooling sources (11, 14) are connected to the heat transfer device (4) so that the preheating, further heating and cooling of the supply air take place through the common heat transfer device.

8 Claims, 4 Drawing Sheets

AIR-CONDITIONING INSTALLATION FOR ROOM SPACES

This invention relates to an air-conditioning installation for room spaces, comprising a heat transfer device for transferring heat from exhaust air removed from the room spaces into supply air to be supplied into the room spaces;

heating means connected to a heating source for further heating the supply air;

cooling means connected to a cooling source for cooling the supply air; and adjusting means for sensing the temperature of the supply air and for controlling the heat transfer device and the heating and cooling means on the basis of the sensed temperature.

A central air-conditioning installation is used for heating room spaces in the winter and cooling them in the summer by heating or cooling the air supplied into the room space, i.e. the supply air. In addition, the recovery of heat from the air exhausted from the room spaces, i.e. from the exhaust air, and the transfer of the heat into the supply air, have recently become more common.

It is customary to construct separate units for all thermic operations, such as a heat transfer device for the recovery of heat from the exhaust air to the supply air, a heating device for heating the supply air, a cooling device for cooling the supply air, etc. These devices are each provided with separate feed or circulation pipeline systems for the heating or cooling energy, including separate pumps, safety and closing devices, meters, control valves, etc. In addition, a complete adjustment and monitoring equipment is required for each unit.

Accordingly, a great number of different devices are required for the air-conditioning installation, and considerable costs are caused by the acquisition, installation, tuning and maintenance of the devices. The costs of the required thermally insulated energy transfer pipeline systems and adjustment systems are often higher than those of the entire air-conditioning machine. These pipeline systems require plenty of space in the building, which, of course, further increases the costs.

If one wants to utilize not only the energy of the exhaust air but also other low-energy level waste energy, such as condensation heat, still another unit is required, which involves extra costs.

As there are plenty of devices, the energy consumption is easily high. For instance, each heat exchanger causes a pressure loss, which increases the power consumption of the blower of the air-conditioning machine, and each pump consumes power. The costs of the electrification of the air-conditioning machine are high, as each device has to be provided with wiring and contactors, mechanically operated switches, safety devices, etc. As all operating units are separate, there sometimes occurs undesired overlapping of the different operations, such as simultaneous cooling and recovery of heat, which further increases the consumption of energy and costs. Due to the great number of devices, the entity is highly liable to disturbances and is difficult to operate, wherefore the installations rarely operate properly.

The object of the present invention is to provide an air-conditioning installation which avoids the above-mentioned disadvantages and is considerably simpler in structure and more economical. This is achieved by means of an installation according to the invention, which is characterized in that the heating and cooling sources are connected to the heat transfer device so that the preheating, further heating and cooling of the supply air take place through the common heat transfer device.

The invention is based on the idea that the separate units are replaced with a single unit which is used by turns to accomplish the operations previously performed by the required separate units. As only one "multi-purpose" unit is needed, a single energy transfer pipeline system in place of three or four systems, a single pump, a single electric equipment, a single adjustment system, etc., are needed. Pressure losses in the installation are lower, the pumping power is essentially smaller, and the overlapping of the operations is prevented, so that the consumption of energy is substantially lower than in conventional systems. The installation is also less liable to disturbances and substantially easier to use.

In the following the invention will be described in more detail with reference to the attached drawings, in which FIG. 1 shows a structural diagram of a prior art air-conditioning installation;

Figure 1:
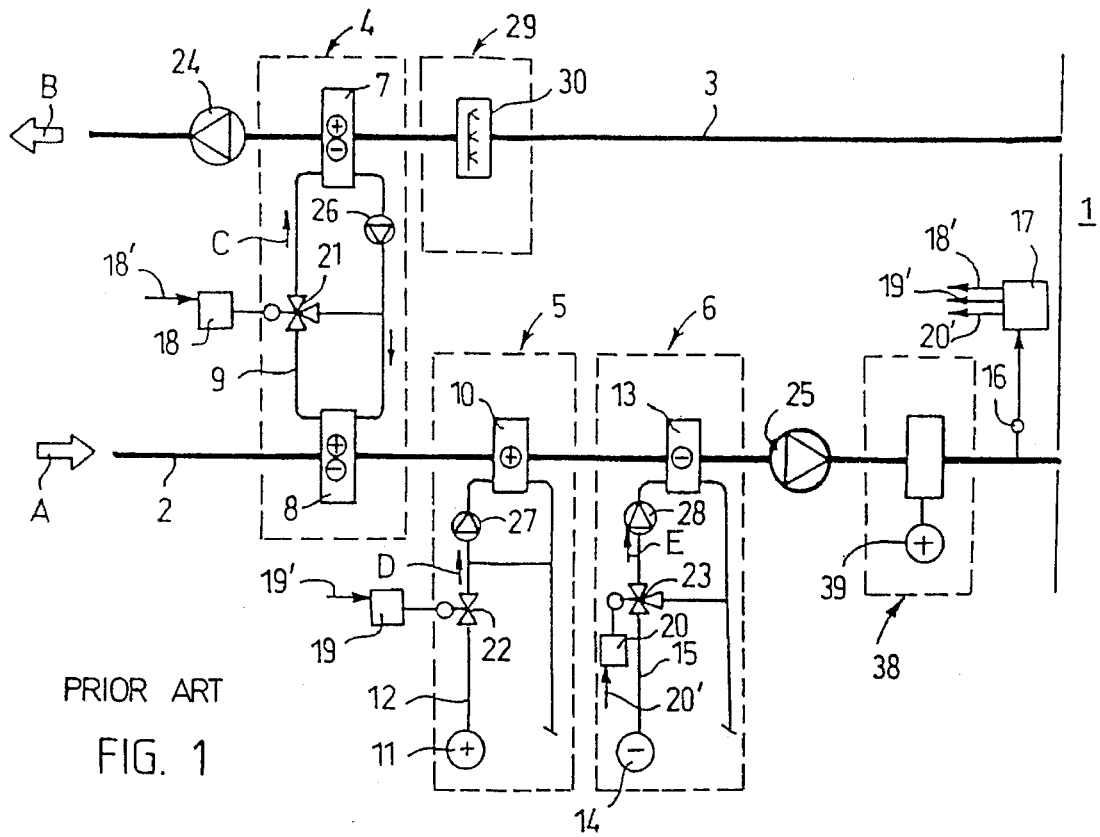

FIG. 1 of the drawings shows an air-conditioning installation known from the prior art. In the figure, a supply duct 2 is provided for supplying supply air A into a building 1, and an exhaust duct 3 is provided for exhaust air B exhausted from the building. The air-conditioning installation comprises a heat transfer device 4 for recovering heat from the exhaust air into the supply air; a heating device 5; and a cooling device 6. The heat transfer device 4 comprises a first heat exchanger 7 connected to the exhaust duct; a second heat exchanger 8 connected to the supply duct; and an interconnecting circulation pipeline system 9 for heat transfer fluid C. The heating device 5 comprises a heat exchanger 10 connected to the supply duct; a heating source 11; and an interconnecting circulation pipeline system 12 for heating fluid D. The cooling device 6 comprises a heat exchanger 13 connected to the supply duct; a cooling source 14; and an interconnecting circulation pipeline system 15 for cooling fluid E.

The air-conditioning installation is provided with a sensing means 16 sensing the temperature of the treated supply air, and an adjustment apparatus 17 comprising logic means required for adjusting and controlling the air-conditioning installation is connected to the sensing means. The adjustment apparatus is connected to send control impulses 18', 19' and 20' to respective adjustment apparatuses 18, 19 and 20 of the heat transfer device, the heating device and the cooling device, which apparatuses, in turn, adjust respective motor valves 21, 22 and 23 in the circulation pipeline system of these devices.

The system comprises blowers indicated 24 (exhaust duct) and 25 (supply duct), and pumps indicated 26 (heat transfer device), 27 (heating device) and 28 (cooling device).

The prior art air-conditioning installation operates in the following way:

In the winter, heat is transferred in the heat transfer device 4 from the exhaust air through the first heat exchanger 7 to the heat transfer liquid and is then pumped by the pump 25 through the circulation pipeline system to the second heat exchanger 8 and therefrom into the supply air. When the heat is not needed, the adjustment apparatus 18 receives the respective impulse 18' and adjusts the valve 21 so that the flow of liquid in the circulation pipeline system bypasses the second heat exchanger 8.

At low subzero temperatures, heat obtained from the exhaust air is not sufficient for preheating the supply air. In such a case the adjustment apparatus 19 of the heating device 5 receives the respective impulse 19' from the adjustment apparatus 17 and adjusts the valve 22 so that the heating fluid is allowed to be pumped by the pump 27 from the heating source into the heat exchanger 10 for further heating the supply air.

In the summer the temperature of the outdoor air is higher than the required temperature of the supply air, and the supply air has to be cooled. For this purpose, the prior art air-conditioning installation comprises a humidifying device 29 which is connected to the exhaust duct and which comprises a humidifier 30 for humidifying the exhaust air. The humidification evaporates water into the exhaust air, and so the temperature of the exhaust air is reduced. The cooling power so obtained is transferred by the heat recovery of the heat transfer device 4 and through the circulation pipeline system into the supply air, so that the supply air is cooled correspondingly. If this precooling is not sufficient, the adjustment apparatus 20 of the cooling device 6 receives the impulse 20' from the adjustment apparatus 17 and adjusts the valve 23 so that the cooling fluid is allowed to be pumped by the pump 28 from the cooling source to the heat exchanger 13 for cooling the supply air.

Figure 2:
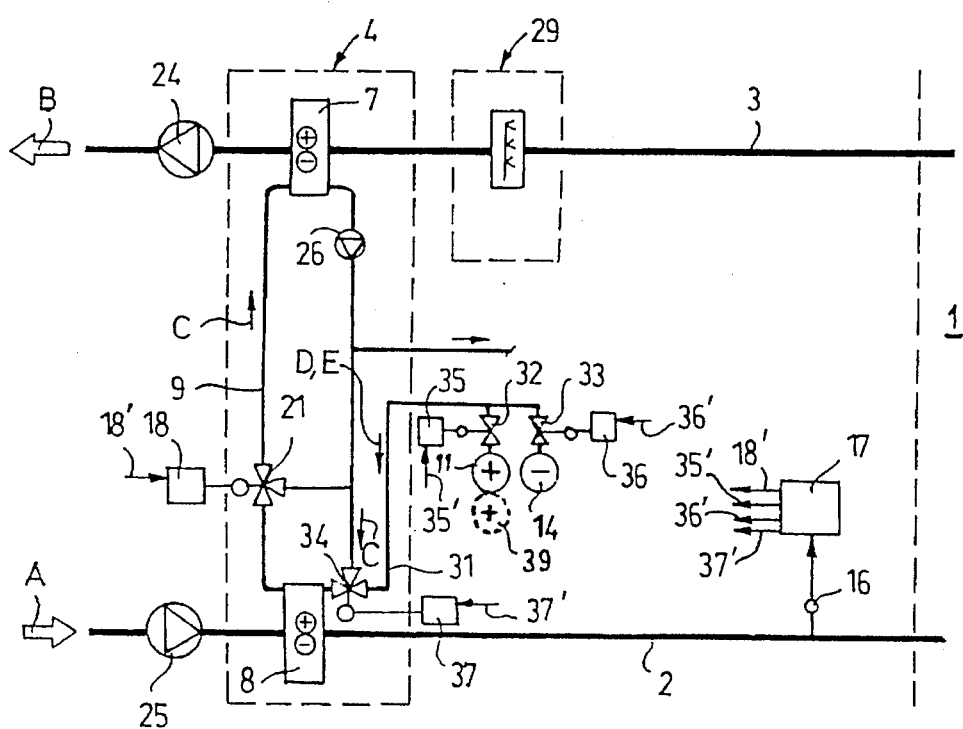
FIG. 2 shows a structural diagram of a preferred embodiment of an air-conditioning installation according to the invention.

FIG. 2 shows a structural diagram of an air-conditioning installation according to the invention. In the figure, the same reference numerals as in FIG. 1 are used for the substantially corresponding parts.

The air-conditioning installation comprises a heat transfer device 4 comprising a first heat exchanger 7, a second heat exchanger 8 and a circulation pipeline system 9 and an adjustment apparatus 18, a motor valve 21 and a pump 26.

According to the invention, a heating source 11 is connected by a line 31 to the circulation pipeline system 9 of the heat transfer device through a shut-off valve 32. Similarly a cooling source 14 is connected by the same line to the circulation pipeline system through a shut-off valve 33. The line 31 is connected to the circulation pipeline system through a motor valve 34.

An adjustment apparatus 17 responsive to the temperature of the supply air is connected to control the valve 21 of the heat transfer device, the valve 32 of the heating source, and the valve 33 of the cooling source as well as the motor valve 34 by means of the respective adjustment apparatuses 18, 35, 36 and 37.

The air-conditioning installation operates in the following way:

In the winter, heat is recovered from the exhaust air and transferred to the supply air by means of the heat transfer device 4. The adjustment apparatus 17 keeps the valves 32, 33 and 34 closed until the preheating of the supply air effected by the heat transfer device is sufficient for raising the temperature of the supply air to a desired level.

In cases where the preheating of the supply air by the heat transfer from the exhaust air is not sufficient, the adjustment apparatus applies impulses 35' and 37' to the adjustment apparatuses 35 and 37 of the valves 32 and 34 to open the valves. The heating source 11 is thus allowed to feed more heat to the circulation pipeline system 9 and the second heat exchanger 8.

When the supply air has to be cooled in the summer, the adjustment apparatus 17 generates the impulses 36' and 37' for starting a humidifying device 29 and for causing the adjustment apparatuses 36 and 37 of the valves 33 and 34 to open the valves. The cooling source 14 is thus able to supply further cooling into the circulation pipeline system 9 and the second heat exchanger 8, if the cooling transferred by the heat transfer device 4 from the exhaust air is not enough to cool the supply air.

It is noted that when using the invention, a single heat transfer device is needed in the air-conditioning installation, and no separate heat transfer devices with associated heat exchangers and circulation pipeline systems are needed for additional heating and additional cooling.

If required, it is also possible to connect a condensate heating device 38, FIG. 1, to the circulation pipeline system of the heat transfer device in accordance with the invention, as shown by broken lines in FIG. 2 for a condensate heating source 39.

Figure 3:
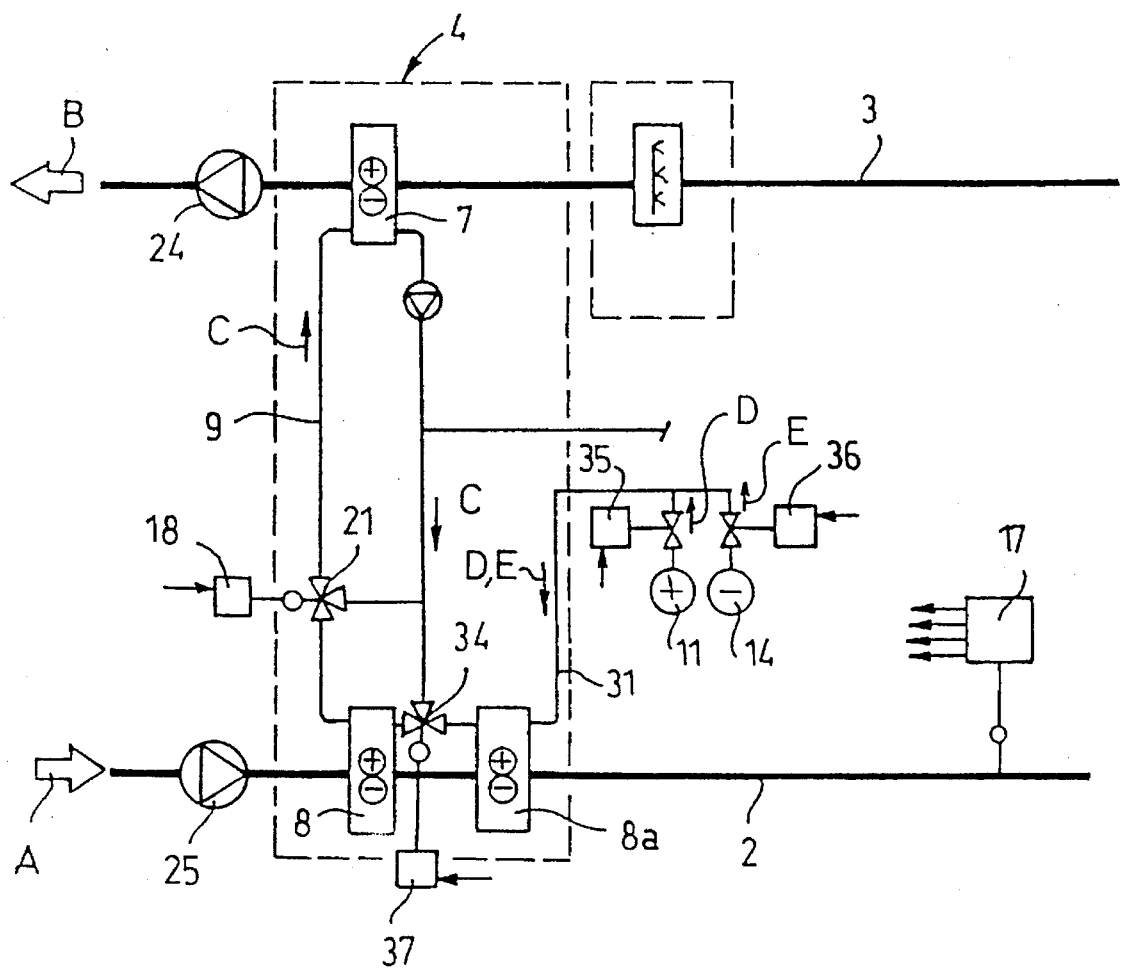
FIG. 3 illustrates an embodiment of the air-conditioning installation in which the heat exchanger on the supply air side of the heat transfer device is of modified structure.

The embodiment of the air-conditioning installation shown in FIG. 3 deviates from that shown in FIG. 2 only in that the second heat exchanger 8 of the heat transfer device 4 has two parts, comprising an additional heat exchanger 8a in addition to the actual heat exchanger 8. The heating source 11 and the cooling source 14 are thereby connected to the circulation pipeline system 9 by means of the line 31 through the additional heat exchanger.

This solution is used e.g. with air-flow-controlled processes where the mass flow rates of air and liquid do not remain constant. The solution prevents the temperature difference of the process from changing in a direction disadvantageous in view of the recovery of heat.

Figure 4:
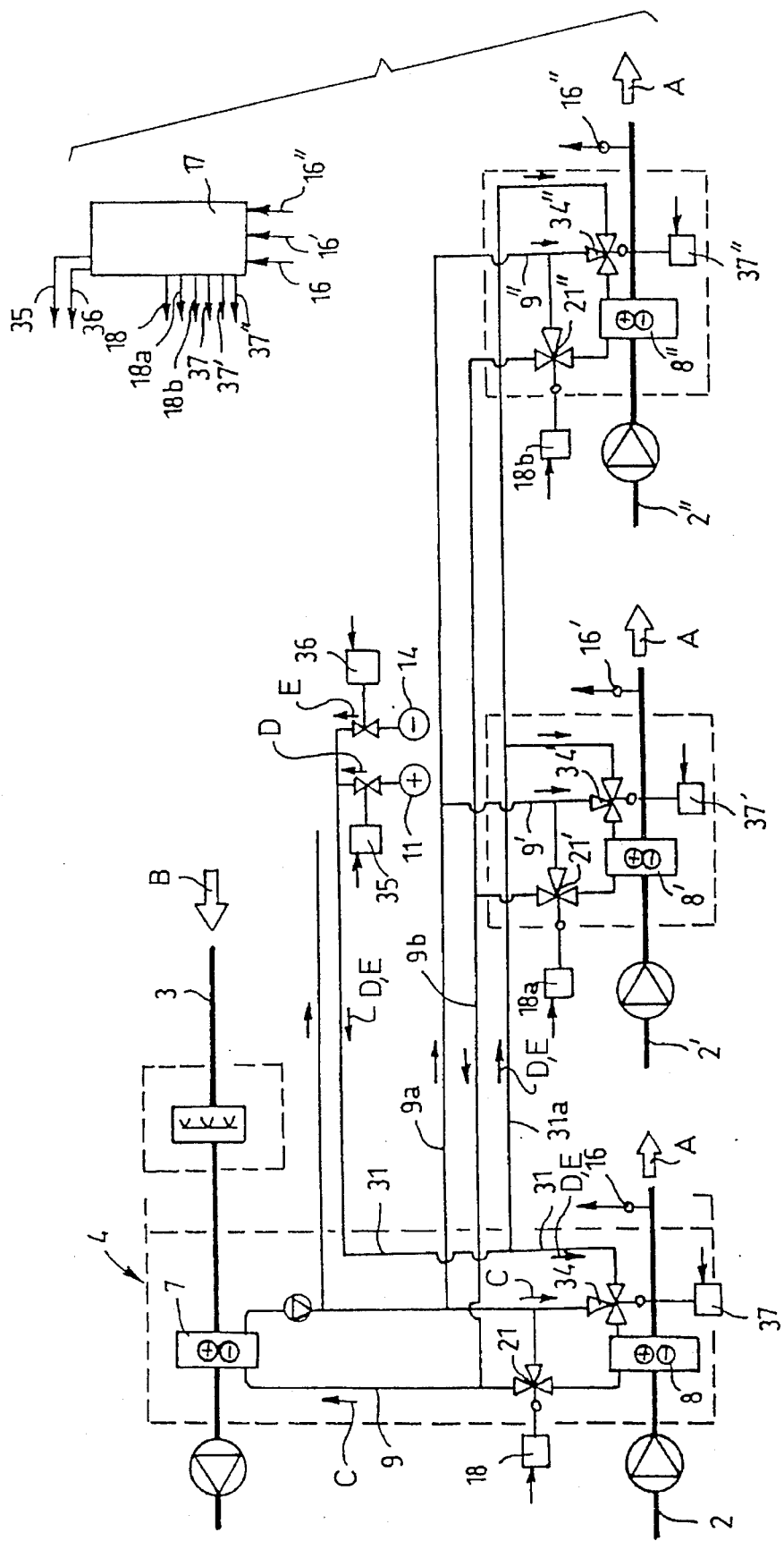
FIGS. 4 and 5 show two different embodiments of the air-conditioning installation with distributed supply air systems.

The embodiment of the air-conditioning installation shown in FIG. 4 comprises a centralized exhaust air system and a distributed supply air system. As the pipeline system is simple, the supply air means can be divided into small local units, so that the supply air ductwork of the building with the required insulation will be small.

FIG. 4 shows three separate supply air ducts 2, 2', 2". The additional ducts 2' and 2" are provided with separate heat exchangers 8' and 8", separate circulation pipeline systems 9' and 9", and separate motor valves 21' and 21", and 34' and 34". The circulation pipeline systems 9' and 9" are connected in parallel with the circulation pipeline system 9 of the heat transfer device 4 by lines 9a and 9b. The circulation pipeline systems 9' and 9" are connected to the heating and cooling sources 11 and 14 by a branch line 31a. In this way the amount of the heating or cooling energy to be supplied to the different supply air ducts can be adjusted independently of each other by means of the valves 34, 34' and 34".

The reverse is also possible, i.e. the supply air system may be centralized and the exhaust air system may be distributed, i.e., comprise two or more exhaust air ducts 3.

Figure 5:
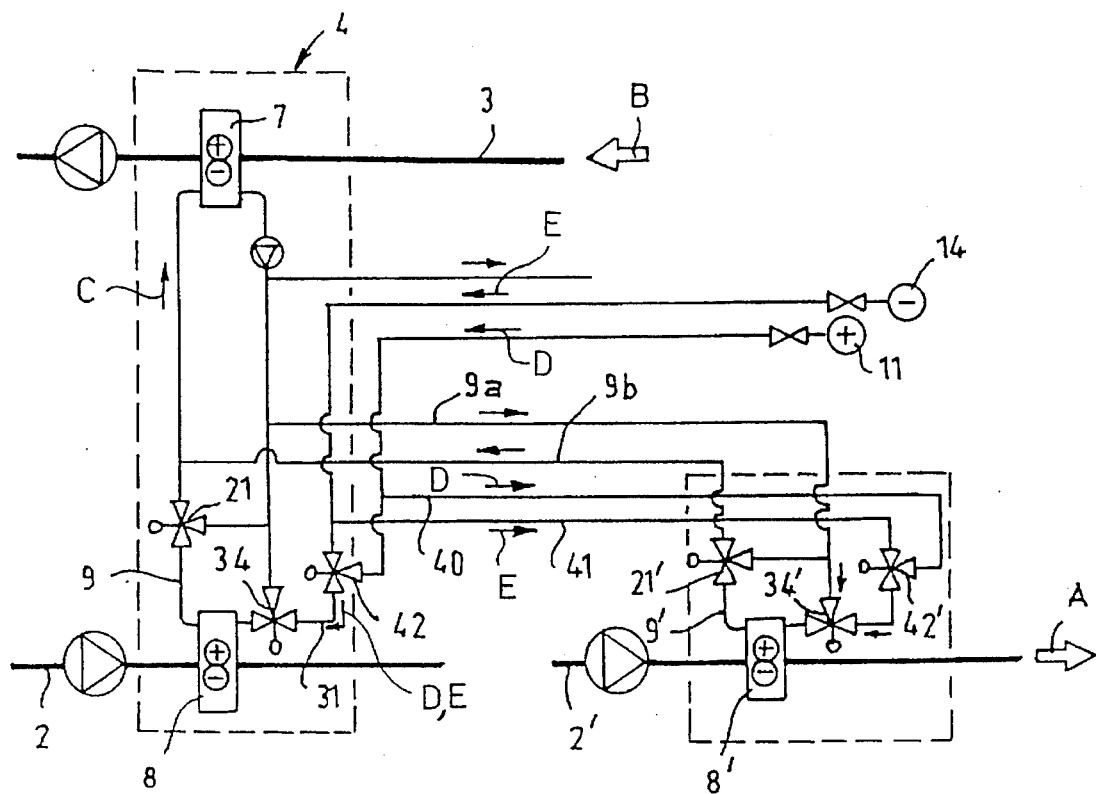

FIG. 5 illustrates an embodiment of the air-conditioning installation in which the supply air system is distributed similarly as in FIG. 4. In FIG. 4, the heating and cooling sources are connected to the heat exchangers 8, 8' and 8" of the supply air ducts by means of a common line 31. It is thus possible to supply only heating fluid or only cooling fluid simultaneously to all heat exchangers. In the solution of FIG. 5, the heating source and the cooling source are connected to the heat exchangers 8, 8' and 8" by separate lines 40 and 41 through distribution valves 42 and 42', so that either fluid can be fed into each heat exchanger irrespective of the kind of fluid fed into the other heat exchangers.

The above embodiments of the invention are by no means intended to restrict the invention, but the invention may be modified within the scope of the claims as desired. For example, it is clear that the installation according to the invention need not always comprise all the operations shown in FIG. 1, but the humidifying operation, for instance, may be omitted if not required. FIG. 1 has to be taken as a mere example of a prior art solution in which all possible operations are included. The installation according to the invention may comprise all these operations if considered necessary. It is, of course, also possible in the invention to use all known pipe connections, such as 2-way valves, etc. All known adjusting methods may also be used with the invention; for instance, the output messages of the adjuster 17 may be applied directly to the motor valves 21 and 34, etc.

I claim:

1. Air-conditioning installation for room spaces (1), comprising a heat transfer device (4) including a circulation pipeline system (9) for transferring heat from exhaust air (B) removed from the room spaces into supply air (A) to be supplied into the room spaces;

a heating means connected to a heating source (11) for further heating the supply air;

cooling means connected to a cooling source (14) for cooling the supply air; and adjusting means (16, 17, 18, 21, 32, 33, 34) for sensing the temperature of the supply air and for controlling the heat transfer device and the heating and cooling means on the basis of the sensed temperature; characterized in that the heating and cooling sources (11, 14) are connected by means of a common line (31) to the circulation pipeline (9) for heat transfer fluid (C) of the heat transfer device (4) between the supply air (A) and the exhaust air (B) so that the heat transfer, further heating and cooling of the supply air (A) take place through the common heat transfer device (4).

2. Installation according to claim 1, wherein the heat transfer device (4) comprises at least one first heat exchanger (7) connected to an exhaust air duct (3) for the exhaust air (B) and to at least one second heat exchanger (8) connected to a supply air duct (2) for the supply air (A), and the interconnecting circulation pipeline system (9) for heat transfer fluid (c), characterized in that the heating source (11) and the cooling source (14) are connected to the circulation pipeline system (9) of the heat transfer device (4) by means of a line (31) for supplying heating fluid (D) and cooling fluid (E), respectively, into the circulation pipeline system and further to the second heat exchanger (8).

3. Installation according to claim 1, comprising an exhaust air duct (3) having a first heat exchanger (7) for exhaust air (B), and at least two separate supply air ducts (2, 2', 2") each having a second heat exchanger (8, 8', 8") for supply air (A), the heat exchangers being connected to a common pipeline system (9, 9', 9", 9a, 9b) for heat transfer fluid (C), characterized in that the heating source (11) and the cooling source (14) are connected by a common line (31, 31a) to each one of the second heat exchangers (8, 8', 8") through an amount adjustment valve (34, 34', 34").

4. Air-conditioning installation for room spaces (1), comprising a heat transfer device (4) for transferring heat from exhaust air (B) removed from the room spaces into supply air (A) to be supplied into the room spaces;

a heating means connected to a heating source (11) for further heating the supply air;

cooling means connected to a cooling source (14) for cooling the supply air; and adjusting means (16, 17, 18, 21, 32, 33, 34) for sensing the temperature of the supply air and for controlling the heat transfer device and the heating and cooling means on the basis of the sensed temperature;

characterized in that the heating and cooling sources (11, 14) are connected by means of a common line (31) to the circulation pipeline (9) for heat transfer fluid (C) of the heat transfer device (4) between the supply air (A) and the exhaust air (B) so that the heat transfer, further heating and cooling of the supply air (A) take place through the common heat transfer device (4), wherein the heat transfer device (4) comprises at least one first heat exchanger (7) connected to an exhaust air duct (3) for the exhaust air (B) and at least one second heat exchanger (8) connected to a supply air duct (2) for the supply air (A), and an interconnecting circulation pipeline system (9) for heat transfer fluid (C), characterized in that the heating source (11) and the cooling source (14) are connected to the circulation pipeline system (9) of the heat transfer device by means of a line (31) for supplying heating fluid (D) and cooling fluid (E), respectively, into the circulation pipeline system and further to the second heat exchanger (8), with the heating source (11) and the cooling source (14) are connected to the circulation pipeline system (9) of the heat transfer device (4) through a device (34) which allows selectively only heat transfer fluid (C) or heat transfer fluid and further heating fluid (C, D) in an adjustable ratio or only cooling fluid (E) to enter the second heat exchanger (8).

5. Installation according to claim 4, characterized in that the valve (34) is operated by an adjusting means (37) controlled by a sensing means (16) sensing the temperature of the supply air (A).

6. Installation according to claim 5, characterized in that the second heat exchanger (8) of the heat transfer device (4) has two parts, one (8) of which is connected to the circulation pipeline system (9) of the heat transfer device and the other part (8a) is connected to a line (31) which connects the heating source (11) and the cooling source (14) to the circulation pipeline system so that both parts (8, 8a) of the heat exchanger are positioned in series with respect to the passage of the heating fluid (D) and the cooling fluid (E).

7. Installation according to claim 4 characterized in that the second heat exchanger (8) of the heat transfer device (4) has two parts, one (8) of which is connected to the circulation pipeline system (9) of the heat transfer device and the other part (8a) is connected to a line (31) which connects the heating source (11) and the cooling source (14) to the circulation pipeline system so that both parts (8, 8a) of the heat exchanger are positioned in series with respect to the passage of the heating fluid (D) and the cooling fluid (E).

8. Air-conditioning installation for room spaces (1), comprising a heat transfer device (4) for transferring heat from exhaust air (B) removed from the room spaces into supply air to be supplied into the room spaces;

a heating means connected to a heating source for further heating the supply air;

cooling means connected to a cooling source (14) for cooling the supply air; and adjusting means (16, 17, 18, 21, 32, 33, 34) for sensing the temperature of the supply air and for controlling the heat transfer device and the heating and cooling means on the basis of the sensed temperature;

characterized in that
> the heating and cooling sources (11, 14) are connected by means of a common line (31) to the circulation pipeline (9) for heat transfer fluid (C) of the heat transfer device (4) between the supply air (A) and the exhaust air (B) so that the heat transfer, further heating and cooling of the supply air (A) take place through the common heat transfer device (4),
>
> further including the heat transfer device (4) comprises at least one first heat exchanger (7) connected to an exhaust air duct (3) for the exhaust air (B) and at least one second heat exchanger (8) connected to a supply air duct (2) for the supply air (A), and an interconnecting circulation pipeline system (9) for heat transfer fluid (C), characterized in that the heating source (11) and the cooling source (14) are connected to the circulation pipeline system (9) of the heat transfer device (4) by means of a line (31) for supplying heating fluid (D) and cooling fluid (E), respectively, into the circulation pipeline system and further to the second heat exchanger (8),
>
> further including an exhaust air duct (3) having a first heat exchanger (7) for exhaust air (B), and at least two separate supply air ducts (2, 2', 2") each having a second heat exchanger (8, 8', 8") for supply air (A), the heat exchangers being connected to a common pipeline system (9, 9', 9", 9a, 9b) for heat transfer fluid (C) characterized in that the heating source (11) and the cooling source (14) are connected by means of separate lines (40, 41) to each one of the second heat exchangers (8, 8') through a change-over valve (42, 42') and an amount adjustment valve (34, 34').

* * * * *

UNITED STATES PATENT AND TRADEMARK OFFICE
CERTIFICATE OF CORRECTION

PATENT NO. : 5,573,058
DATED : November 12, 1996
INVENTOR(S) : Ingmar ROLIN

It is certified that error appears in the above-indentified patent and that said Letters Patent is hereby corrected as shown below:

At column 6, line 21 (Claim 6) after "device" insert --(4)--.

At column 6, line 58 (Claim 8) after "supply air" insert --(A)--.

At column 6, line 59 (Claim 8) after "source" insert --(11)--.

Signed and Sealed this

Ninth Day of September, 1997

*Attest:*

BRUCE LEHMAN

*Attesting Officer*   *Commissioner of Patents and Trademarks*